United States Patent [19]

Barrington

[11] Patent Number: 5,149,422
[45] Date of Patent: Sep. 22, 1992

[54] FINITE PARTICLE REMOVAL SYSTEM

[75] Inventor: Barry L. Barrington, North-Great Falls, Mont.

[73] Assignee: Analytic Laboratories, Inc., Merrillvill, Ind.

[21] Appl. No.: 632,129

[22] Filed: Dec. 20, 1990

[51] Int. Cl.⁵ .............................................. B01D 35/06
[52] U.S. Cl. ..................................... 210/85; 204/302; 204/306; 210/143; 210/223; 210/243
[58] Field of Search ......... 204/140, 302, 306, DIG. 5; 210/85, 137, 143, 222, 223, 243, 232, 498, 746, 748, 138; 55/100

[56] References Cited

U.S. PATENT DOCUMENTS

| | | | |
|---|---|---|---|
| 3,252,885 | 5/1966 | Griswold | 210/243 |
| 3,393,143 | 7/1968 | Waterman et al. | 204/306 |
| 4,238,326 | 12/1980 | Wolf | 210/223 |
| 4,285,805 | 8/1981 | Stegelman | 204/302 |
| 4,594,138 | 6/1986 | Thompson | 204/302 |
| 4,961,845 | 10/1990 | Dawson et al. | 210/243 |
| 5,055,190 | 10/1991 | Hayes et al. | 210/222 |
| 5,061,376 | 10/1991 | MacGregor | 210/243 |

FOREIGN PATENT DOCUMENTS 45457 2/1962 Poland .................... 210/222

Primary Examiner—Robert A. Dawson
Assistant Examiner—Joseph Drodge
Attorney, Agent, or Firm—Laff, Whitesel, Conte & Saret

[57] ABSTRACT

A filter for removing finite particles from a fluid is comprised of a plurality of magnetic perforated plates, negatively, electrostatically charged, perforated plates, and positively, electrostatically charged, perforated plates with filter media disposed between the plates. The plates are disposed in succession in the path of fluid flow. The fluid flows through the perforations in the plates, and finite particles are removed therefrom by the interaction of those particles with force fields generated by the plates. Particles are further removed from the fluid by the action of the filter media. Also, a system control prevents any fluid from passing through the filter when an insufficient charge is present on the electrostatically charged plates.

12 Claims, 2 Drawing Sheets

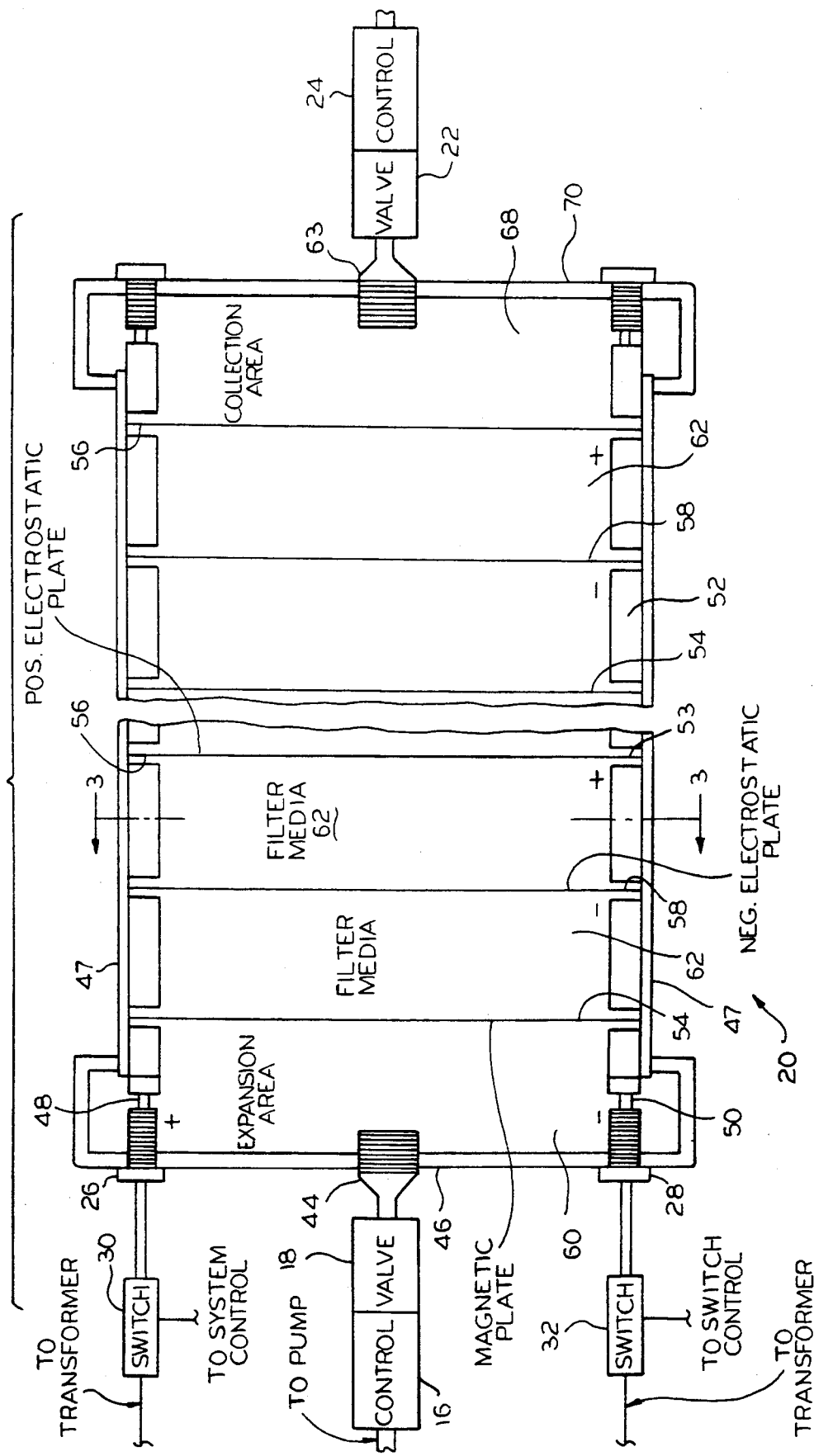

FINITE PARTICLE REMOVAL SYSTEM

BACKGROUND AND SUMMARY OF THE INVENTION

This invention relates generally to improvements in electrostatic filters for use with filtering and rejuvenating contaminated fluids, such as oils and the like. The basic structure of a finite particle removal system employing electrostatic and/or magnetic means are well known in the art, and is disclosed, for example, in the following patents:

| Hirama | 4,935,133 | 6-19-90 |
| Pera | 4,716,024 | 12-29-87 |
| Mintz et al. | 4,634,510 | 1-6-87 |
| Nozawa et al. | 4,620,917 | 11-4-86 |
| Collins | 4,303,504 | 12-1-81 |
| Robinson | 4,254,393 | 3-3-81 |
| Watson | 4,190,524 | 2-26-80 |
| Davies | 3,655,550 | 4-11-72 |
| Van Vroonhoven | 3,484,362 | 12-16-69 |
| Lochmann et al. | 3,398,082 | 8-20-68 |
| Miyata | 3,349,354 | 10-24-67 |

From the above prior art, it is clear that the use of either electrostatic and/or magnetic force fields adds to the filtration effectiveness of a filter.

Such electrostatic and magnetic filters have become quite popular in recent years for many reasons. Many of these filters are designed specifically to filter oils or other petroleum products, and as such offer the user of such fluids an alternative to purchasing more such fluids when the original supply becomes contaminated through use. Considering the often high prices of petroleum products, it is highly desirable to have a filter that can remove any contaminants from those fluids, and rejuvenate such fluids so that their effective lifetimes are extended. Furthermore, environmental concerns regarding the disposal of used, contaminated fluids has led many users to seek methods for filtering and rejuvenating those fluids, again extending their lifetimes. Use of such methods and filters results in great savings to the users of those fluids.

Many different configurations of electrostatic and/or magnetic filters have been employed in the past. The patent of Miyata, U.S. Pat. No. 3,349,354, generally discloses a device for treating hydrocarbon fuels with electric and magnetic fields. Specifically, this patent discloses the use of rod or bar magnets to generate a magnetic field, and another rod to generate an electric field. Fluids to be treated flowed through a bore, thereby subjecting the fluids to the combined effects of the fields. It is unclear if this device has any filtering properties.

The patent of Lochmann et al., U.S. Pat. No. 3,398,082, discloses a method for electrostatic filtration of dielectric fluids by using a plurality of alternatively charged electrostatic perforated plates. This invention, however, did not contemplate the addition of a magnetic field along with the electrostatic fields generated by the perforated plates. The patent of Van Vroonhoven, U.S. Pat. No. 3,484,362, also discloses the use of a dielectric filter media disposed between adjacent electrostatic elements inside the filter. This invention also did not contemplate the use of magnetic fields in the filtration process.

The patent of Robinson, U.S. Pat. No. 4,254,393, discloses the use of both an electric and magnetic fields to treat a hydrocarbon fuel to increase fuel efficiency. This patent is structurally distinct from the present invention in that it does not contemplate a serial alternation of areas bearing different charges, nor serial alternation of those area with magnetic areas. Also, it is not clear that that patent has any filtration effects.

The current market for fluid filters for use with oils and the like is vast and demanding. The machines these filters service are of high precision, and demand fluids that are substantially lacking in contaminants for proper operation. Due to the costly operation and repair of these machines, it is necessary that these filters perform their functions with extreme accuracy. Further, depending on the particular employment the fluid is engaged in, it may be necessary to target specifically certain species of contaminants for removal. Such filters must be able to remove contaminants of small size, of the order of five microns. Also, such filters, being employed in heavy industry, will need a system of control that can effectively monitor the operation of the filter.

OBJECTS AND SUMMARY OF THE INVENTION

A general object of this invention is to provide a finite particle removal system that has greater efficiency and accuracy that ever before possible through the employment of a filter having an alternation of magnetic and differently charged electrostatic perforated plates disposed in the interior of the filter so that the fluid to be filtered and rejuvenated must pass through the perforations of each plate, and having filter media disposed in the spaces between the successive plates.

Another object of the invention is to provide a system control that can monitor and coordinate the operation of the entire finite particle removal system.

A further object of the present invention is to provide a means, specifically a voltmeter, for determining the time for cleaning of the filter, without the need for a bypass valve.

Another object of the invention is to provide an electrostatic filter that can produce an electrostatic agglomeration effect, thereby increasing the efficiency of the filter.

An object of the invention is to provide an electromagnetic filter that has the ability to target specific contaminants for removal.

Another object of the invention is to provide a filter wherein the size of the perforations on the plates is not as critical to proper operation of the filter as before.

Another object of the invention is to provide a system that can effectively and economically filter and rejuvenate fluids so that the environmental and ecological interests inherent in recycling are advanced.

The filter of the present invention is comprised of a plurality of alternating magnetic, negatively charged electrostatic, and positively charged electrostatic perforated plates, with filter media disposed in the spaces between the plates. The fluid to be filtered is forced to translate through the perforations on the plates, and is thereby affected by the properties of the forces embodied by the plates. Specifically, magnetic contaminants will be collected on the magnetic plates, positively charged contaminants will collect on the negatively charged electrostatic plates, and negatively charged contaminants will collect on the positively charged electrostatic plates. Further, any contaminants translating through the perforations on a charged electrostatic plate will accept the charge of that plate, and will be bound on the next succeeding plate having opposite electrostatic charge. Also, contaminants are trapped in the filter media, with some of them being held there by the forces generated by the plates. This particular construction of the filter is an innovative step in improving electrostatic filters, and allows the filter to achieve its above-stated objects.

The system control of the present invention does not allow a pump, forcing the fluid through the filter, to operate until a charge sufficient for the proper operation of the filter has been applied to the plates inside the filter. This assures that no fluid will exit the filter without experiencing the full rejuvenative effects of that filter. Furthermore, a voltmeter attached across the terminals supplying voltage to the electrostatic plates of the filter allows the monitoring of the level of contamination inside the filter, without the use of a bypass valve, and the determination of the time for cleaning the filter. The construction of the finite particle removal system, and the principle embodied therein, represent a new and innovative advance in the design of such systems, increases the effectiveness of such systems, and adds to the ability of those employing such systems to serve certain environmental concerns by decreasing the need to dispose of the fluids filtered and rejuvenated by the system.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 2 is a cut-away sectional view of a portion of the finite particle removal system, taken along line 2—2 of FIG. 1, showing the internal structure of the filter;

DETAILED DESCRIPTION OF THE PREFERRED EMBODIMENT

Figure 1:
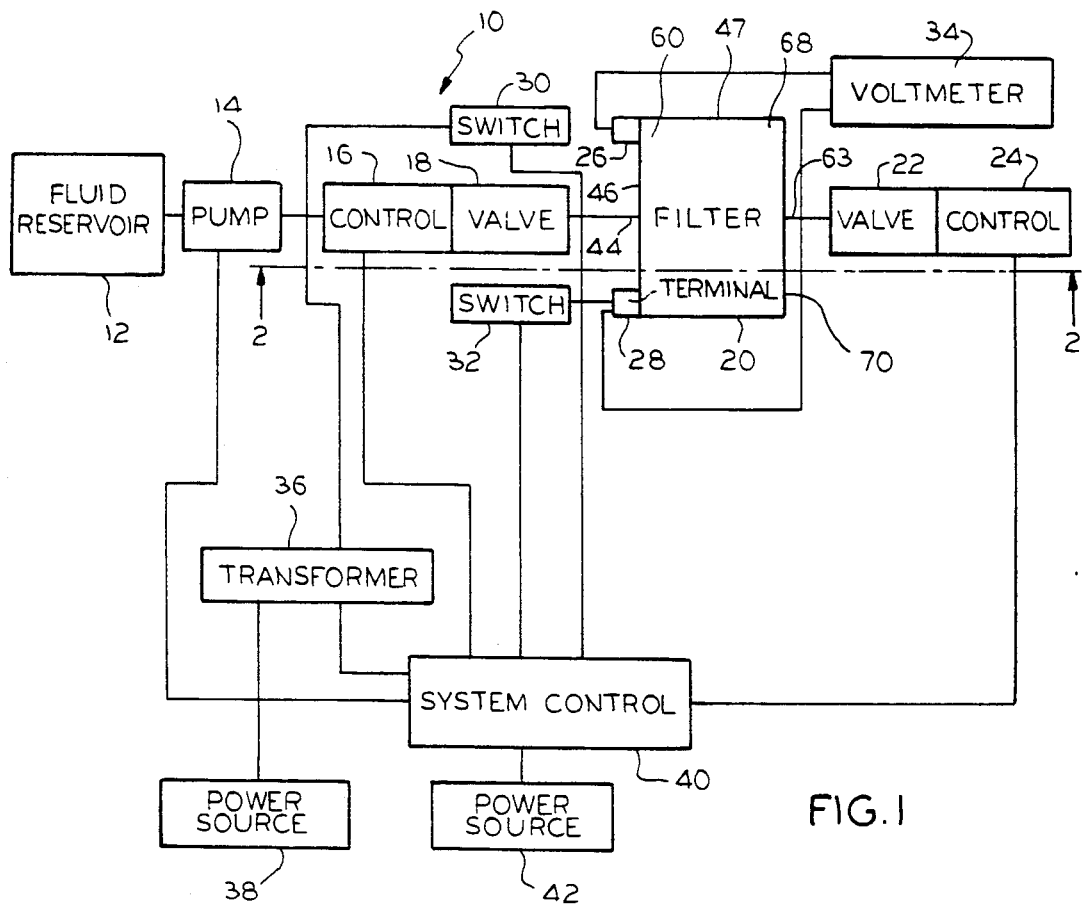
FIG. 1 is a schematic diagram of a finite particle removal system possessing a filter constructed according to the teachings of the present invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Referring generally to FIG. 1, a finite particle removal system 10 possessing a filter 20, constructed according to the teachings of the present invention, is disclosed. Although this particular construction of system and filter is shown here, it is to be understood that a differently constructed system may be employed without departing from the spirit or scope of the invention. Upon operation of the finite particle removal system 10, a fluid to be filtered flows out of the fluid reservoir 12 under the influence of forces exerted by the pump 14. The pump 14 provides sufficient force to translate the fluid throughout the system 10.

The fluid flows through the pump 14 and encounters a valve 18. The operation of this valve 18 is governed by a controlling mechanism 16. The particular operation of this controlling mechanism 16 will be discussed below. This valve 18 allows translation of the fluid through the filter 20 only when the filter 20 has been properly prepared. When the valve 18 is in the open position, the fluid flows into the filter 20, and the valve 18 prevents fluid flow when in the closed position. As the fluid flows through the filter 20, finite particles or contaminants will be removed from the fluid. This filtering process, as well as the particular construction of the filter 20, will be discussed further in relation with FIG. 2.

Once the fluid has traveled through the entire length of the filter, the fluid exits the filter 20, and encounters a valve 22. This valve 22, when in the closed position, prevents the fluid from reversing direction and flowing back into the filter 20 when the filter 20 is not properly prepared, and prevents fluid from flowing from out of the filter 20 when the filter 20 is not in operation. In the open position, the valve 22 allows for free translation of the fluid throughout the remaining portions of the system. The operation of the valve 22 is also governed by a controlling mechanism 24, as will be discussed below.

Referring generally to FIG. 2, the particular construction of the filter 20 is disclosed. The filter 20 is contained by a substantially cylindrical tubular wall 47, having its ends covered by two end portions 46 and 70. These end portions 46 and 70 complete the enclosure of the filter 20 and effectively seal the filter 20 to prevent any leakage of fluid from the interior of the filter 20 to the exterior. The front end portion 46 has three apertures disposed about it, allowing for the insertion of a fluid inlet 44, a positive terminal 26, and a negative terminal 28, all communicating from the exterior of the filter 20 to the interior. The opposite or downstream end portion 70 is constructed similarly to the front end portion 46, with the exception that the downstream end portion 70 has only one aperture, allowing for the insertion of a fluid outlet 63, which communicates from the exterior of the filter 20 to the interior. This fluid outlet 63, constructed similarly to the fluid inlet 44, is connected to the valve 22, and allows for translation of the filtered fluid out of the filter 20 and into other parts of the system.

The fluid inlet 44 accepts fluid from the system 10 and communicates it into an expansion area 60 of the interior of the filter 20. On the other end of the filter 20, the fluid outlet 63 accepts filtered fluid from the collection area 68 constructed similarly to the expansion area 60, and communicates it to the system.

Figure 3:
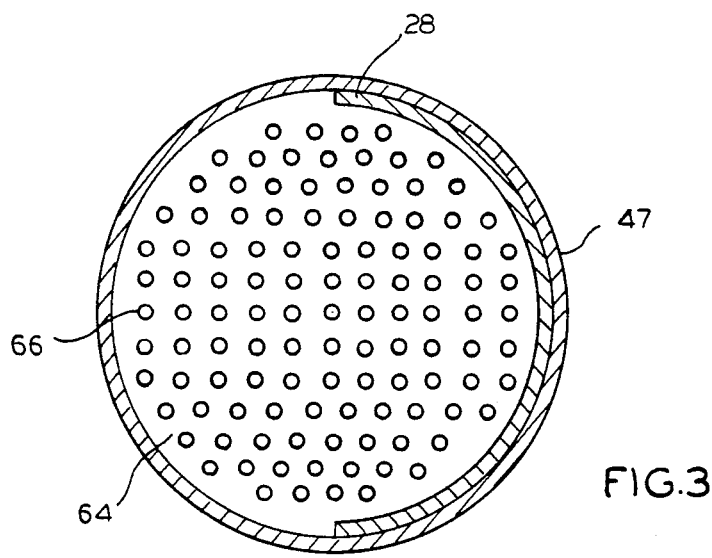
FIG. 3 is a cut-away sectional view of a portion of the filter, taken along line 3—3 of FIG. 2, showing the particular construction of one of the plates.

Plates 54, 56, and 58 are spaced regularly across the interior of the filter 20. These plates 54, 56, and 58 are circular in shape and extend across the cross-sectional area of the interior of the filter 20 at selected locations, and thus, the entire fluid must encounter all of the plates 54, 56, and 58. The plates 54, 56, and 58 have perforations 66, as shown in FIG. 3, disposed about and through their surfaces, which allow for translation of the fluid to be filtered through them. When the fluid passes through these perforations 66, the fluid is subjected to the electrostatic or magnetic forces imparted by the respective plate. It is the action of these forces that increase the effectiveness of the filter 20, as will be discussed below in connection with the disclosure of the plates 54, 56, and 58. The size of the perforations 66 is not critical to the proper operation of the filter 20, and is primarily dependent on the fluid to be filtered. This is a significant improvement over the prior art.

Disposed along the length of the filter 20, between the plates 54, 56, and 58, are portions of filter media 62. This filter media 62 is of known composition, and often is used in the art. This filter media 62 fills the entire space within the interior of the filter 20 that is located between two consecutive plates 54, 56, and 58. The filter media 62 is not disposed in either the expansion area 60, or the collection area 68. In the preferred construction shown in FIG. 2, the fluid to be filtered enters the filter 20 through the fluid inlet 44, and passes into the expansion area 60. There the fluid collects to fill the entire expansion area 60, so that the entire area of the filter 20 is effectively exposed to the fluid. Then, the fluid encounters a magnetic plate 54.

The magnetic plates 54 are comprised of permanent magnetic material, such as magnet steel, ceramic, and the like. These plates 54 generate a magnetic force that is concentrated about the perforations 66 in the magnetic plates 54. This concentration of magnetic force causes magnetic contaminants, such as metals, acids, and the like, to be attracted magnetically to the plates 54 and to become bound there magnetically as the contaminants travel in proximity to through the perforations 66 on the plate 54.

Once the fluid to be filtered passes through the perforations 66 in the magnetic plate 54, the fluid encounters the filter media 62. The filter media 62 captures more contaminates present in the fluid, and aids in the filtration process. The the filter media 62 traps contaminants of sufficient size, and this process is well known in the art.

The fluid then passes out of the filter media 62 and encounters an electrostatically charged negative plate 58. Due to the electrostatic charge on this plate 58, contaminants present in the fluid that have a negative charge are repelled by the plate 58 due to the Coulomb force, and are trapped in the filter media 62 located in front of that plate 58. Contaminants that have a positive charge are attracted by the electrostatic charge on the plate 58, again due to the Coulomb force, and accept a negative charge as the contaminants pass through the perforations 66 in the plate 58. Contaminants having no charge will also pass through the perforations 66 in the plate 58, and will accept a negative charge as well. Once these contaminants have accepted a negative charge, they are repelled from the plate 58 by the Coulomb force. Furthermore, the contaminants are attracted to the positive charge present on the following positive plate 56, also due to the Coulomb force. The combination of these forces causes the contaminants to be forced into the filter media 62 which is disposed behind the negative plate 58, and retained there.

When the contaminants encounter the positive plate 56, an effect similar to the effect of the negative plate 58 disclosed above takes place. Any positively charged contaminants that remain in the fluid will be repelled by the Coulomb force due to the charge on the plate 56, and will be held in the filter media 62 disposed between the positive plate 56 and the negative plate 58. Contaminants that have a negative charge will be attracted to the positive plate 56 by the Coulomb force, and will accept a positive charge as they pass through the perforations 66 in the plate 56, and thereby be repelled by the plate 56 by the same force, and be forced into the filter media 62 behind the positive plate 56.

Any contaminants still remaining in the fluid will go through the same four step process again and again, depending on the number of plates 54, 56, and 58 disposed in the filter 20, increasing the effectiveness of the filter 20. It has been found that a series of eight plates, at least two magnetic, three positively charged electrostatic, and three negatively charged electrostatic, is sufficient to produce satisfactory filtration results. The preferred embodiment, however, possesses fifteen plates: five each of magnetic, positively charged electrostatic, and negatively charged electrostatic, disposed in the interior of the filter 20 in serial order as disclosed above.

Once the fluid has passed through the entire length of the filter 20, the fluid enters the collection area 68, where the fluid gathers until it is communicated finally out of the filter 20 through the fluid outlet 63. The filtered and rejuvenated fluid may now freely translate freely about the remainder of the system.

The disposition of the electrostatic plates 56 and 58 causes an agglomeration effect which significantly adds to the effectiveness of the filter 20. Specifically, the electrostatic charging of the contaminants causes the contaminants to become electrostatically attracted to each other, forming an agglomerate. This agglomerate increases in size until it can no longer pass through the filter media 62. By this method, the filter 20 of the present invention is more effective than filters of the prior art because the filter 20 is able to capture smaller particles of contaminants than before due to the agglomeration process.

Also, charged contaminants are attracted to the electrostatic plate 56 or 58 having the opposite charge, and are bound there electrostatically. Once one contaminant is bound about the plate 56 or 58, that contaminant extends outwardly away from the plate 56 or 58. This has the effect of increasing the surface area of the plate 56 or 58 and increasing the effectiveness of the filter 20. This effect also makes the present invention more effective than prior filters.

The electrostatic charges needed for proper operation of the filter 20 are supplied by a transformer 36. The transformer 36 receives electrical power from a power source 38. The transformer 36 preferably is capable of delivering a variable voltage within the range of 110 to 20,000 volts. The transformer 36 delivers this voltage to the filter 20 at a positive terminal 26, through a switch 30 governed by the system control 40, and at a negative terminal 28, also through a switch 32 governed by the system control 40. The application of this voltage induces an electrostatic charge, which is necessary for the proper operation of the filter 20, on the electrostatic plates disposed within the interior of the filter 20. The voltage across the positive terminal 26 and the negative terminal 28 is monitored by a voltmeter 34, the significance of which will be discussed below.

The entire operation of the finite particle removal system 10 is governed and monitored by a system control 40. This system control 40 performs a variety of necessary functions, as will become evident below, and receives its power from a power source 42. Beginning with a shut down system, with all valves closed, no charge present on the plates of the filter 20, and all elements being inactive, the system control 40 instructs the transformer 36 to apply a sufficient voltage to the positive terminal 26, through the switch 30, and the negative terminal 28, through the switch 32, of the filter 20, while simultaneously instructing the switch 30 on the positive terminal 26 and the switch 32 on the negative terminal 32 to open and allow the application of that voltage to those terminals 26 and 28. This voltage induces a charge on the electrostatic plates 56 and 58 of the filter 20.

After a certain time period, preferably of five seconds or more, has elapsed since the application of the voltage to the terminals 26 and 28, and not before, the system control 40 simultaneously instructs the pump 14 to begin operation, and causes the controlling mechanism 16 to open the valves 18 and 22, allowing the fluid to flow through the fluid inlet 44 and into the expansion area 60, described herein, of the filter 20. The fluid flows through the perforations 66 in the plates 54, 56, and 58 disposed in the interior of the filter 20, and through the filter media 62. As the fluid flows among these elements, contaminants are removed from the fluid, thereby filtering and rejuvenating the fluid. Once the fluid has been so treated, it flows into the collection area 68 of the filter 20 and from there flows out of the filter 20 through the fluid outlet 63. A procedure, similar to that regarding controlling mechanism 16, occurs with the controlling mechanism 24, which opens the valve 22, allowing filtered fluid to flow into other parts of the system.

It is important that there be a time delay between the application of the voltage to the filter 20, and the initialization of pump 14 operation and the opening of valves 18 and 22. This time delay is necessary to ensure that an appropriate charge has built up on the electrostatic plates 56 and 58 of the filter 20, for without this appropriate charge, the filter 20 will not function properly.

Also, the voltmeter 34 can be monitored by the system control 40, thereby allowing the system control 40 to shut down the operation of the system 10 when a certain, pre-determined voltage level has been achieved. The significance of this will be discussed herein. These aspects of the system control 40, and the finite particle removal system 10 as a whole, is a new innovation for improving the operation of such systems, and results in greater filtering of the fluid.

The positive terminal 26, exteriorly to the filter 20, is connected electrically first to a voltmeter 34, and then, through a switch 30, to the transformer 36. Similarly, the negative terminal 28 is connected electrically first to the same voltmeter 34, and then, through a switch 32, to the transformer 36. The operation and construction of the transformer 36, and the switches 30 and 32 were discussed above. The terminals 26 and 28 are connected to the voltmeter 34 in such a manner that the voltmeter 34 measures the potential difference across those terminals 26 and 28.

The positive terminal 26, inside the filter 20, is connected electrically to the positive conductor 48, and delivers a voltage applied by the transformer 36, through the switch 30, to the conductor 48. The conductor 48 is disposed substantially parallel to the arcuate wall 47, and extends the entire length of the filter 20. The conductor 48 is substantially half-cylindrical in shape, and extends 180 degrees inside the arcuate wall 47 of the filter 20. The conductor 48 is comprised of materials, and is constructed in such a fashion so as to easily accept the voltage applied by the transformer 34. The conductor 48 is disposed near to the arcuate wall 47, so as to allow maximum area for the disposition of the plates 54, 56, and 58 and the filter media 62.

The negative terminal 28, inside the filter 20, is connected electrically to the negative conductor 50, and delivers a voltage applied by the transformer 36, through the switch 32, to the conductor 50. The conductor 50 is disposed substantially parallel to the arcuate wall 47, and extends the entire length of the filter 20. The conductor 50 is also substantially half-cylindrical in shape, and extends 180 degrees inside the arcuate wall 47 of the filter 20. The conductor 50 is comprised of similar materials and constructed similarly to the conductor 48. The conductor 50 is also disposed near to the arcuate wall 47, for the same reasons stated above in relation to conductor 48. The conductors 48 and 50 are disposed within the interior of the filter 20 in such a manner so that there is no possibility of physical connection between them. This is necessary to prevent an electrical short circuit in the filter 20, due to the opposite charges on the conductors 48 and 50. For this reason, the conductors 48 and 50 are disposed in separate and distinct 180 degree portions of the interior of the filter 20.

Also located in the interior of the filter 20, expansion joints 52 are disposed substantially parallel to the arcuate wall 47, the positive conductor 48, and the negative conductor 50, with one edge thereof abutting the conductors 48 and 50. These expansion joints 52 are composed of insulating material, such as PVC or the like, and prevent contact between the electrostatically charged plates 56 and 58 to prevent a short circuit. However, the expansion joints 52 are not continuous over the entire length of the filter 20. Specifically, there are apertures 53 regularly spaced along the expansion joints 52, which allow for support of the plates 54, 56, and 58, and also allow for the electrostatic plates 56 and 58 to contact their respective conductors 48 and 50, so that the conductors 48 and 50 can apply the voltage from the transformer 36 to the plates 56 and 58, respectively.

Another significant improvement of the filter 20 over the prior art is the use of a voltmeter 34 to monitor the voltage across the positive terminal 26 and the negative terminal 28. When the filter 20 is in operation, contaminants collect on the electrostatic plates 56 and 58, and in the filter media 62. This collection, once it reaches a certain level, causes a change in voltage across the terminals 26 and 28. Specifically, once the filter media 62 becomes substantially impregnated with contaminants, or contaminants agglomerate to the degree that the agglomeration forms an electrical connection between a site of positive charge and a site of negative charge on the electrostatic plates 56 and 58, the potential difference between the two terminals will fall. A voltage drop will become evident long before the contaminants collect in sufficient numbers to form a short circuit in the filter 20. Therefore, by monitoring of that voltage by means of a voltmeter 34, the operator of the system 10 will know when the filter has become dirty and in need of cleaning. The system control 40 can also monitor this voltage automatically, and shut down the system 10 when contaminants have caused a significant voltage drop. This voltmeter 34 eliminates the need for bypass valve to measure the effectiveness of the filter 20, and is a significant improvement over the filters of the prior art.

The filter 20, constructed according to the teachings of the present invention, is a significant improvement over filters of the prior art, and embodies a number of new, special features which will add to the effectiveness and usefulness of such filters. The filter 20 is especially adept at removing contaminants consisting of carbon compounds, especially hydrocarbons, acids, and metals. However, the filter 20 is not limited to those particular compounds. The filter 20 is easily able to remove any contaminant capable of bearing an electrostatic charge, or any magnetic contaminant from a fluid. The filter 20 has the ability to screen the fluid for contaminants of various sizes. Furthermore, and more importantly, the filter 20 is capable of targeting a particular finite particle or contaminant for removal by the adjustment of the intensity of the magnetic and electrostatic fields generated by the plates 54, 56, and 58. The filter 20 is highly efficient in filtering and rejuvenating fluids. Use of this filter 20, or the concepts embodied therein, can permit greater recycling and use of existing fluids. When considering the global environmental problems concerning the manufacture and disposal of fluids, such as oils, the filtration of which this filter was primarily designed, the usefulness and necessity of this filter becomes clear.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

I claim:

1. A finite particle removal system for use in the filtration of a fluid having a filter comprising: a wall surrounding the filter; an upstream portion and a downstream end portion disposed closing opposite ends of the wall; the front upstream portion having a fluid inlet, and the downstream end portion having a fluid outlet; the fluid inlet being capable of translating fluid from outside the filter into an expansion area within the filter; the expansion area being disposed immediately downstream of the fluid inlet inside the wall and immediately upstream of a series of perforated plates and filter media; the fluid outlet being capable of translating fluid from a collection area, inside the filter, out of the filter; the collection area being disposed immediately downstream of the series of perforated plates and filter media which are each disposed across an interior cross-section of the wall surrounding the filter, said perforated plates including magnetic plates, second plates, and third plates; a positive terminal and a negative terminal adapted to transmit positive and negative voltages to a positive conductor and a negative conductor, respectively; the positive conductor and the negative conductor being disposed substantially parallel and in proximity to the wall, and extending continuously alongside the series of plates; the positive conductor and the negative conductor being disposed within the wall in such manner that there is no physical contact between the positive conductor and the negative conductor; expansion joints having apertures parallel to the wall, the positive conductor, and the negative conductor, with the positive conductor and the negative conductor being disposed between the expansion joints and the wall, and the expansion joints abutting either the positive conductor or the negative conductor; the perforated plates having portions disposed within the apertures enabling support of the perforated plates, and enabling each of the second and third plates to make contact with the positive conductor and the negative conductor, respectively, such that electrostatic voltages on the positive conductor and the negative conductor can be applied to the respective plates; said perforations in said plates enabling fluid to flow through the plates; and filter media disposed between each of the plates in the series.

2. A finite particle removal system for use in the filtration of a fluid having a filter comprising the elements of claim 1 wherein a voltmeter is connected between the positive terminal and the negative terminal for measuring the potential difference between the positive terminal and the negative terminal.

3. A finite particle removal system for use in the filtration of a fluid having a filter comprising the elements of claim 2 and means responsive to a monitoring of the potential difference measured by the voltmeter for preventing an operation of the system when that monitored potential difference reaches a certain level.

4. A finite particle removal system for use in the filtration of a fluid having a filter comprising the elements of claim 1 and a pump which forces the fluid through the filter and system control means for applying a voltage to the positive terminal and the negative terminal and for delaying the operation of said pump for a time period which is sufficient to allow electrostatic charges, appropriate for proper operation of the filter, to accumulate on the second and third plates.

5. A finite particle removal system for use in the filtration of a fluid having a filter comprising the elements of claim 4 wherein the fluid inlet is connected to a first valve and the fluid outlet is connected to a second valve, which control the translation of fluid into and out of the filter; the valve connected to the fluid inlet is connected to the pump which forces the fluid through the system, and the system further including controlling mechanisms and system control means for operating the pump and the valves in order to assure that fluid does not flow through the filter when insufficient electrostatic charges are present on the second and third plates.

6. A finite particle removal system for use in the filtration of a fluid having a filter comprising the elements of claim 1 wherein the perforated plates comprise at least one set of plates arranged in the following order: a magnetic perforated plate, a third perforated plate, and a second plate.

7. A finite particle removal system for use in the filtration of a fluid having a filter comprising the elements of claim 6 wherein the order is repeated at least three times.

8. A finite particle removal system for use in the filtration of a fluid having a filter comprising the elements of claim 1 wherein the perforated plates comprise at least two magnetic plates and four second and third plates.

9. A finite particle removal system for use in the filtration of a fluid having a filter comprising the elements of claim 1 wherein the plates are constructed of such a form so as to enable concentrating of a force field surrounding their perforations.

10. A fluid filter comprising: a housing defining a fluid flow path; a plurality of sets of apertured spaced plates positioned along and traversing said flow path; and each of the sets of plates including a first magnetic plate, a second plate, and a third plate, the filter having means for conducting a negative, electrostatic charge on each of the second plates and for conducting a positive, electrostatic charge on each of the third plates, and a body of filter media between each of the spaced plates of each of the sets, each of the magnetic plates being a permanent magnet having opposite magnetic poles at opposite sides.

11. A finite particle removal system comprising a filter, as defined in claim 10, and charging means connected with the means for conducting electrostatic charges on the second and third plates for imparting negative and positive charges respectively thereto.

12. A finite particle removal system, as defined in claim 11, which includes flow control means for controlling a flow of fluid through the filter, and means for operating the charging means and the flow control means to prevent a fluid flow through the filter in response to less than predetermined electrostatic charges being conducted to the second and third plates.

* * * * *